(No Model.)

J. N. BERRY.
THILL COUPLING.

No. 423,208. Patented Mar. 11, 1890.

WITNESSES.
Henry Marsh.
George T. Butterfield

INVENTOR.
Joseph N. Berry
by N. H. Reuell
Attorney

UNITED STATES PATENT OFFICE.

JOSEPH N. BERRY, OF BOSTON, MASSACHUSETTS.

THILL-COUPLING.

SPECIFICATION forming part of Letters Patent No. 423,208, dated March 11, 1890.

Application filed October 9, 1889. Serial No. 326,360. (No model.)

*To all whom it may concern:*

Be it known that I, JOSEPH N. BERRY, of Boston, in the county of Suffolk and State of Massachusetts, have invented a new and useful Improvement in Thill-Couplings, of which the following, taken in connection with the accompanying drawings, is a specification.

This invention relates to the class of thill-couplings in which an interposed spring serves to prevent rattling of the connected parts and an adjusting-nut permits the pressure to be varied.

The peculiar novelty of my device is a curved metallic spring bearing against the heel of the thill-iron and extending rearwardly beneath the axle-tree, terminating in a threaded portion, with a nut upon it bearing against the side of the nut which is screwed upon the rear end of the clip. The advantages of this arrangement are the ready adjustability of the parts to take up any wear, the convenience of exchanging thills for pole, &c., without spring-pressure upon the coupling during the change, and the impossibility of loss of the nuts of the clip or the adjusting-spring, since each part is a safe-guard for the adjacent nut.

Figure 1:
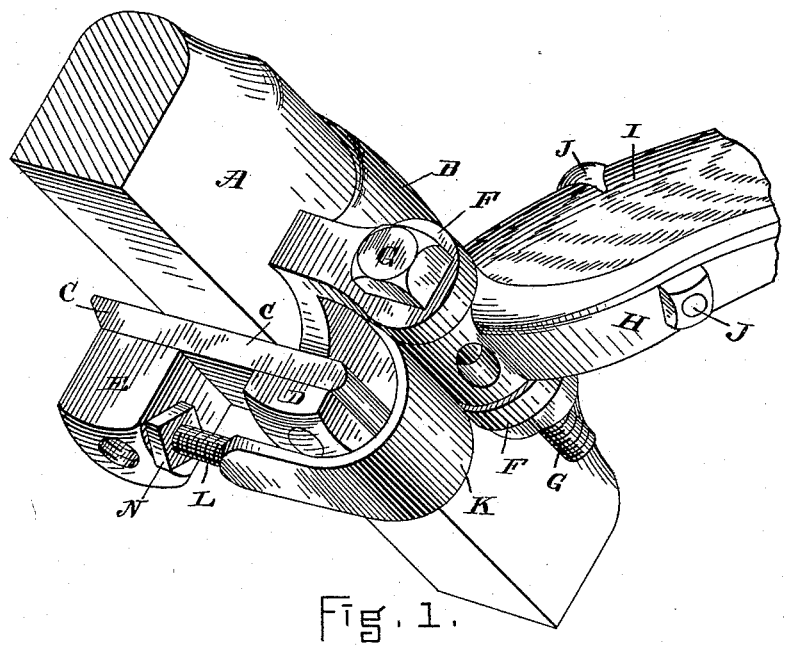
Figure 2:
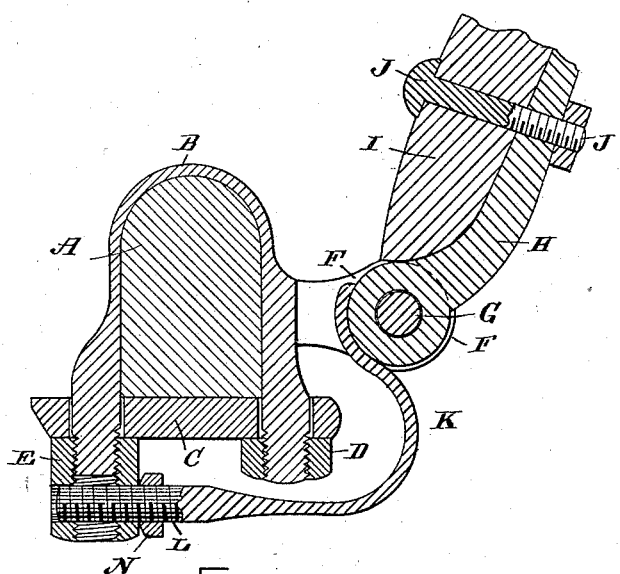

In the drawings, Figure 1 is a perspective under side view showing my device applied as in practical use. Fig. 2 is a vertical section through the connected parts.

A represents the axle-tree; B, the clip surrounding it; C, the cross-piece beneath it, through which the threaded lower ends of the clip extend to receive the nuts D E.

F F are ears or lugs extending forward from the clip and having terminal perforations to receive the bolt G, which connect them to the thill-iron H, fixed to the rear end of the thill I by the usual bolts J.

K is a broad curved metallic spring fitting at its free end around the semi-cylindrical heel portion of the thill-iron H and extending downwardly and rearwardly therefrom, terminating in a threaded stem L, which runs back nearly through an unthreaded perforation formed horizontally through the rearmost clip-nut E. On such threaded stem is the adjusting-nut N, which engages said threads and bears against the face of the enlarged clip-nut E, so as by tightening to impart any desired tension to the spring K, and thus adjust its pressure on the heel of the thill-iron and prevent any rattling in the joint.

It will be observed that the elongated nut E performs the usual function of a clip-nut, and in addition thereto forms a guard for the stem L of the spring and a bearing or abutment for the nut N on such stem. The connection of these parts is such that the nut E cannot unscrew at all. The nut D cannot so move as to become lost, and the adjusting-nut is retained permanently on the stem L.

I claim as my invention—

1. The combination of the thill-iron, the axle-clip, and their connecting-bolt with the curved spring-piece K L, bearing at one end against the heel of the thill-iron and having at its rear end a threaded extension with an adjusting-nut thereon, said nut abutting against a firm bearing depending from the axle-clip, for the purpose set forth.

2. The thill-iron and connecting-bolt, the axle-clip, and the thickened nut on the threaded rear portion of the clip, such nut having a transverse perforation, as shown, in combination with the curved spring-piece K L, bearing on the heel of the thill-iron and having a threaded extension entering the transverse perforation in said thickened nut, and with the adjusting-nut on such extension abutting on the side of the thickened nut, substantially as set forth.

In testimony whereof I have signed my name to this specification, in the presence of two subscribing witnesses, on this 7th day of September, A. D. 1889.

JOSEPH N. BERRY.

Witnesses:
A. H. SPENCER,
R. E. BELLOWS.